(12) United States Patent
Park et al.

(10) Patent No.: US 12,515,620 B2
(45) Date of Patent: Jan. 6, 2026

(54) ELEVATING APPARATUS

(71) Applicants: HYUNDAI MOTOR COMPANY, Seoul (KR); KIA CORPORATION, Seoul (KR); SEOHAN INNOBILITY CO., LTD., Chungcheongbuk-do (KR)

(72) Inventors: Hyeong Seop Park, Hwaseong-si (KR); Jae Hun Kim, Hwaseong-si (KR); Chang Seop An, Incheon (KR); Jae Geun Bang, Hwaseong-si (KR); Jung Min Cho, Hwaseong-si (KR); Seong Kweon Joo, Hwaseong-si (KR)

(73) Assignees: HYUNDAI MOTOR COMPANY, Seoul (KR); KIA CORPORATION, Seoul (KR); SEOHAN INNOBILITY CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 18/914,671

(22) Filed: Oct. 14, 2024

(65) Prior Publication Data

US 2025/0289401 A1 Sep. 18, 2025

(30) Foreign Application Priority Data

Mar. 14, 2024 (KR) .................. 10-2024-0035688

(51) Int. Cl.
*B60S 9/12* (2006.01)
*B62D 24/00* (2006.01)

(52) U.S. Cl.
CPC ............ *B60S 9/12* (2013.01); *B62D 24/00* (2013.01)

(58) Field of Classification Search
CPC .................................................. B62D 24/00
See application file for complete search history.

(56) References Cited

U.S. PATENT DOCUMENTS

| 3,350,063 | A | * | 10/1967 | Thurlow, Sr. ............ B60S 9/12 254/423 |
| 6,276,477 | B1 | | 8/2001 | Ida |
| 2004/0046337 | A1 | * | 3/2004 | Sproatt .................... B60S 9/12 280/6.156 |
| 2004/0245033 | A1 | | 12/2004 | Saeki |
| 2015/0021952 | A1 | | 1/2015 | Mildner et al. |
| 2020/0180706 | A1 | | 6/2020 | Cha et al. |
| 2021/0331749 | A1 | | 10/2021 | Hwang et al. |
| 2023/0045059 | A1 | | 2/2023 | Cha et al. |

FOREIGN PATENT DOCUMENTS

| CN | 104290822 B | | 7/2018 | |
| DE | 202009005194 U1 | * | 1/2011 | ............... B60S 9/08 |
| JP | 4161792 B2 | | 10/2008 | |
| KR | 2023-0052740 A | | 4/2023 | |
| KR | 102586668 B1 | * | 10/2023 | ............ B60P 1/6427 |

OTHER PUBLICATIONS

DE-202009005194-U1 Machine English Translation (Year: 2011).*
KR-102586668-B1 Machine English Translation (Year: 2023).*

* cited by examiner

*Primary Examiner* — Jason D Shanske
*Assistant Examiner* — Matthew James O'Neill
(74) *Attorney, Agent, or Firm* — MCDONNELL BOEHNEN HULBERT & BERGHOFF LLP

(57) ABSTRACT

An elevating apparatus includes a cabin forming an internal space of a vehicle body and a cabin coupling portion including an elevating module coupled to the cabin and raising the cabin from the ground. The elevating module protrudes to the outside of the vehicle body to raise the cabin.

16 Claims, 18 Drawing Sheets

ELEVATING APPARATUS

CROSS REFERENCE TO RELATED APPLICATIONS

This application claims benefit of priority to Korean Patent Application No. 10-2024-0035688 filed on Mar. 14, 2024 in the Korean Intellectual Property Office, the disclosure of which is incorporated herein by reference in its entirety.

BACKGROUND

1. Field

The present disclosure relates to an elevating apparatus.

2. Description of Related Art

A skateboard platform refers to a type of automotive chassis having a structure in which a battery and a driving motor are mounted thereon in the form of modules, and an upper cabin is disposed thereon. In the case of using such a skateboard platform, various different vehicle models may be produced by changing only the cabin, thereby maintaining high efficiency.

In addition, passenger space within a cabin may be secured by significantly reducing the size, weight, and number of parts of vehicles. The platform length may be freely expanded to reduce development costs.

However, current skateboard platform technology is advantageous only in the common use of car-makers that produce vehicles, but in reality, it is not easy to utilize the technology because it is significantly difficult to install and detach a cabin portion.

According to the related art, in order to install and detach the cabin, the cabin should be transported to a factory, numerous pieces of hardware should be unscrewed using special equipment, and the cabin should be elevated with a crane to be replaced, so it may be better to purchase two cars than to use a skateboard platform.

SUMMARY

An aspect of the present disclosure is to provide an elevating apparatus capable of easily replacing a vehicle cabin on a skateboard platform, and a vehicle including the elevating apparatus.

According to an aspect of the present disclosure, an elevating apparatus includes: a cabin forming an internal space of a vehicle body; and a cabin coupling portion including an elevating module coupled to the cabin and raising the cabin from the ground, wherein the elevating module protrudes to the outside of the vehicle body to raise the cabin.

The elevating module may include a main elevating unit raising the vehicle body, and an auxiliary elevating unit causing the main elevating unit to protrude to the outside of the vehicle body.

When the cabin is not raised or lowered, the main elevating unit may be coupled to the vehicle body in a state in which a direction in which a length of the main elevating unit extends is a longitudinal direction of the vehicle body.

The auxiliary elevating unit may include a second cylinder coupled to a lower portion of the cabin, and a second piston having one side coupled to the main elevating unit and the other side making a translational motion along the second cylinder.

The elevating apparatus may further include a slot formed with a thread along an outer peripheral surface of the second piston, and a protrusion surrounding the second piston and partially protruding to be inserted into the slot.

The main elevating unit may include a first cylinder, and a first piston making a translational motion along the first cylinder.

The auxiliary elevating unit may rotate the main elevating unit to protrude.

According to another aspect of the present disclosure, an elevating apparatus includes a cabin forming an internal space of a vehicle body, a skateboard platform forming a lower portion of the vehicle body and detachably coupled to the cabin, a cabin coupling portion provided in the cabin and including an elevating module capable of raising the cabin from the ground, and a board coupling portion provided on the skateboard platform and coupled to the cabin coupling portion.

The elevating apparatus may further include a first coupling portion coupling the cabin coupling portion to the board coupling portion.

The first coupling portion may include a lower support portion provided at the board coupling portion to protrude toward the cabin coupling portion, and an upper support portion provided at the cabin coupling portion and coupled to the lower support portion.

The lower support portion may include a pressing support portion formed to be depressed toward a center along an outer surface, and the upper support portion may further include a pressing portion pressing the pressing support portion.

The elevating apparatus may further include a second coupling portion aligning the cabin coupling portion and the board coupling portion.

The second coupling portion may further include a second protrusion provided to protrude from the cabin coupling portion toward the board coupling portion, and a second coupling portion formed at a lower portion of the board coupling portion at a height corresponding to the second protrusion.

The second coupling portion may be depressed with a predetermined slope.

According to another aspect of the present disclosure, an elevating apparatus includes a cabin forming an internal space of a vehicle body, a cabin coupling portion coupled to the cabin and including an elevating module capable of raising the cabin from the ground, a driving force generating unit generating driving force capable of driving the elevating module; and a controller controlling the driving force generating unit.

The cabin coupling portion may include first to fourth elevating modules, and the controller may individually control driving force of the first to fourth elevating modules.

The elevating apparatus may further include a detection unit detecting an inclination of the cabin, wherein the controller controls at least one of the first to fourth elevating modules based on the inclination of the cabin.

The elevating module may include a main elevating unit raising the cabin; and an auxiliary elevating unit causing the main elevating unit to protrude toward the outside of the vehicle body, wherein the auxiliary elevating unit rotates the main elevating unit to protrude.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
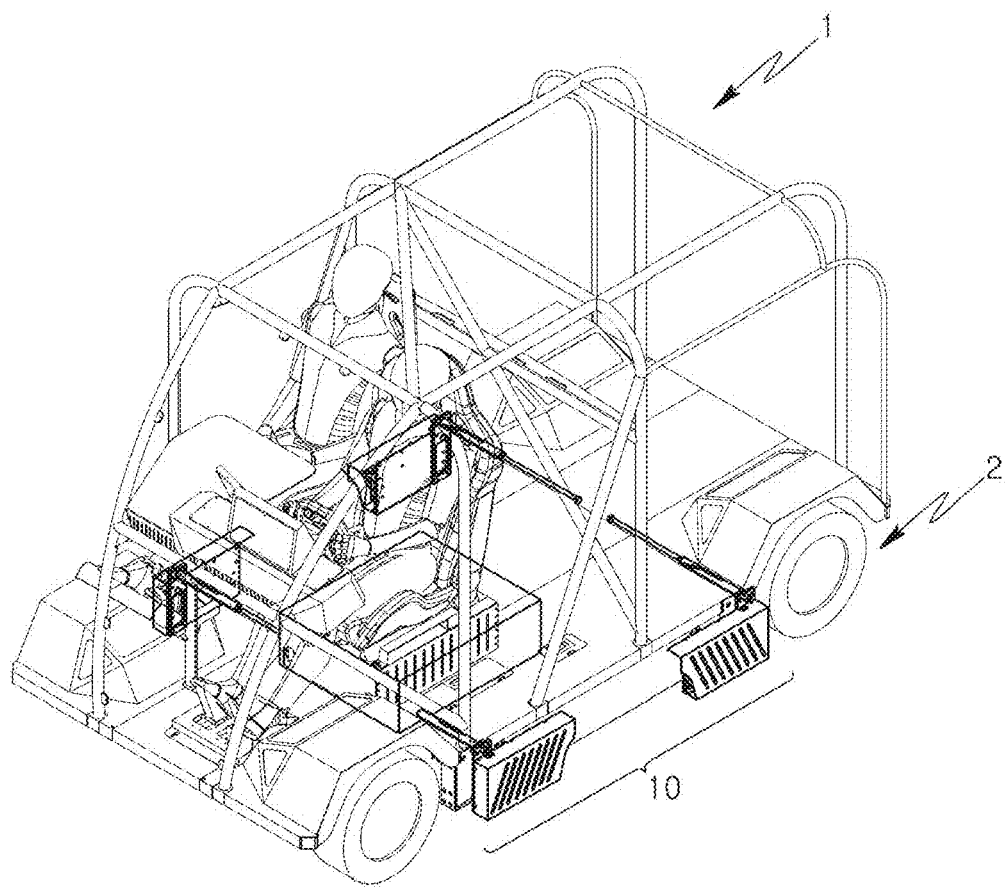
FIG. 1 is a perspective view of a vehicle including an elevating apparatus according to an exemplary embodiment of the present disclosure.

While the present disclosure may be modified in various ways and take on various alternative forms, specific exemplary embodiments thereof are shown in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terms used herein to describe exemplary embodiments of the present disclosure is not intended to limit the scope of the present disclosure. The articles "a," and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Figure 2:
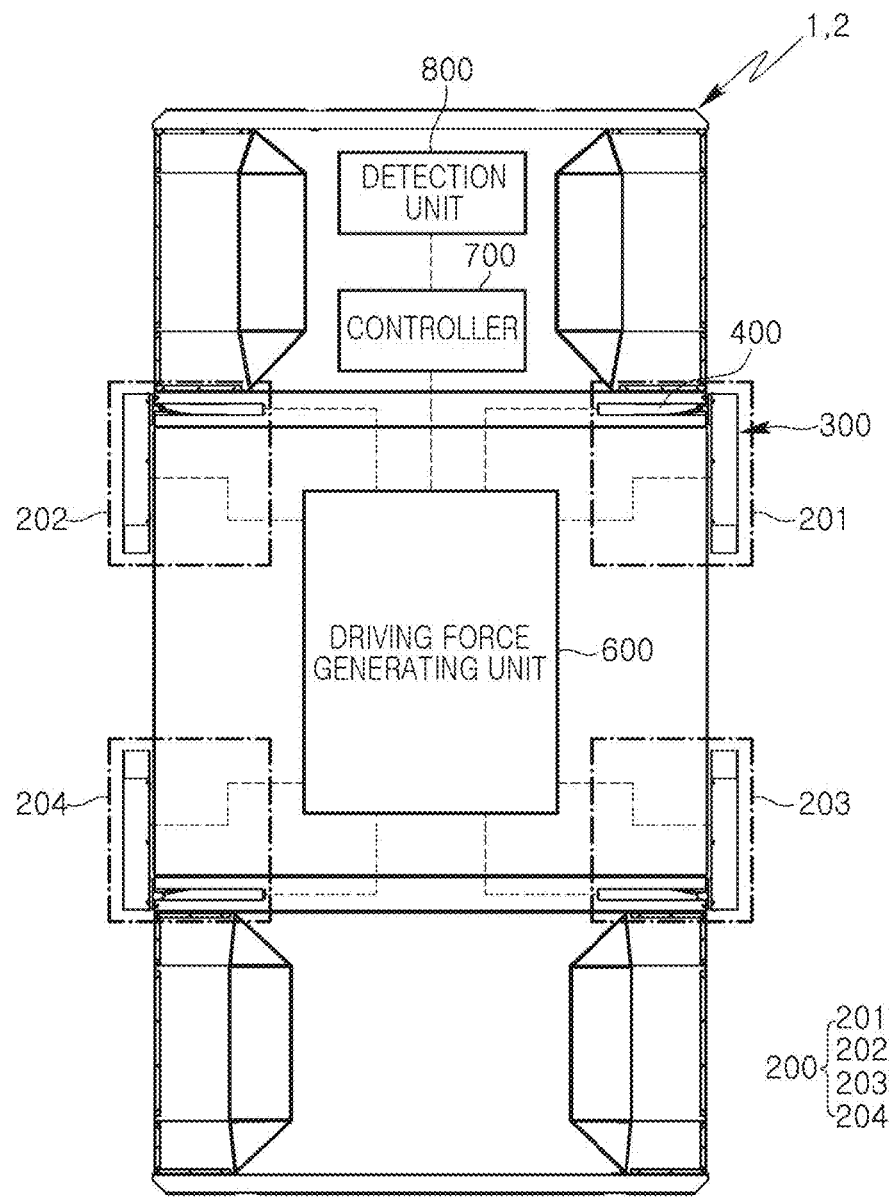
FIG. 2 is a conceptual diagram of a vehicle including an elevating apparatus according to an exemplary embodiment of the present disclosure.
Figure 3:
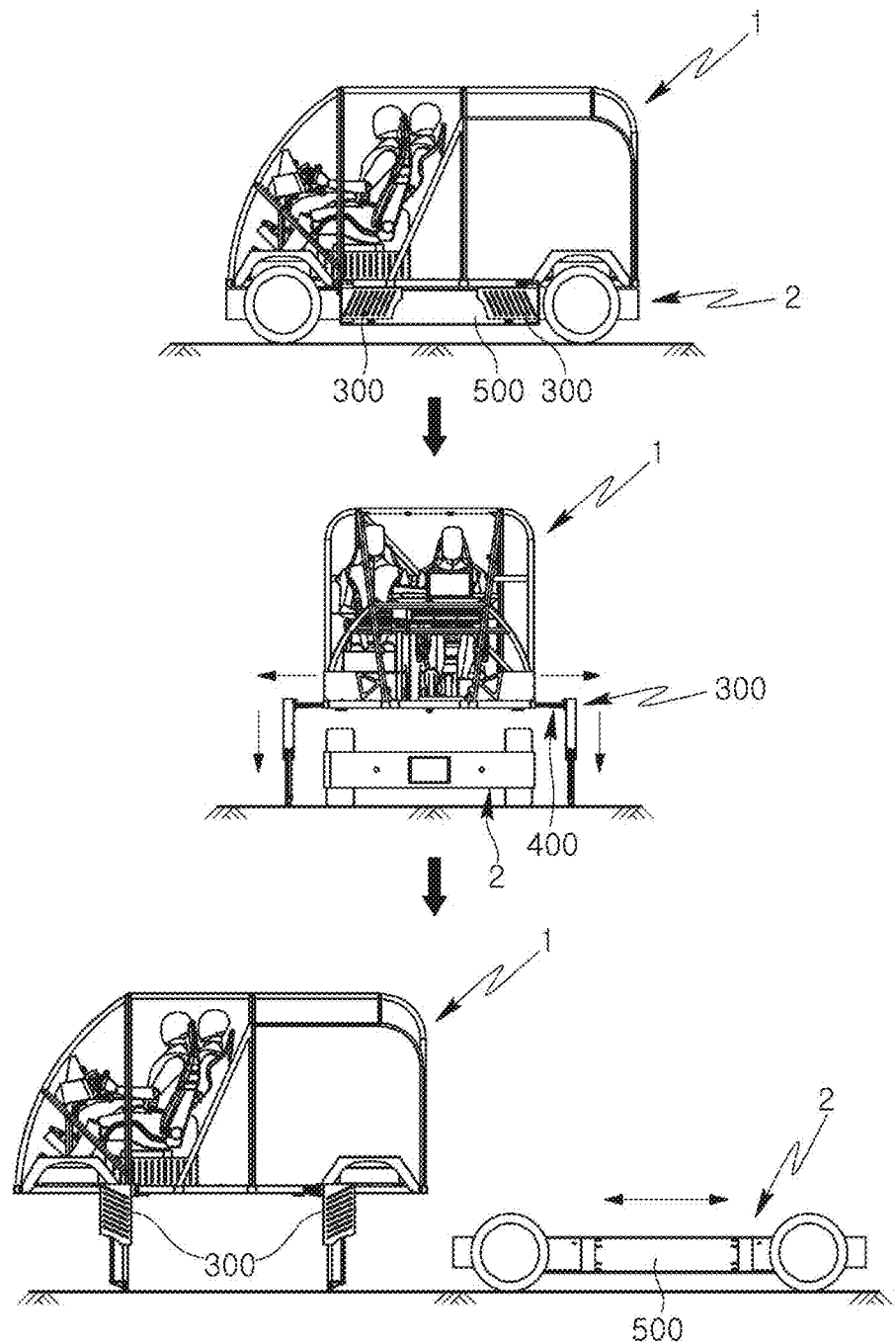
FIG. 3 is a diagram illustrating a process of using an elevating apparatus in a flood situation according to another exemplary embodiment of the present disclosure.
Figure 4:
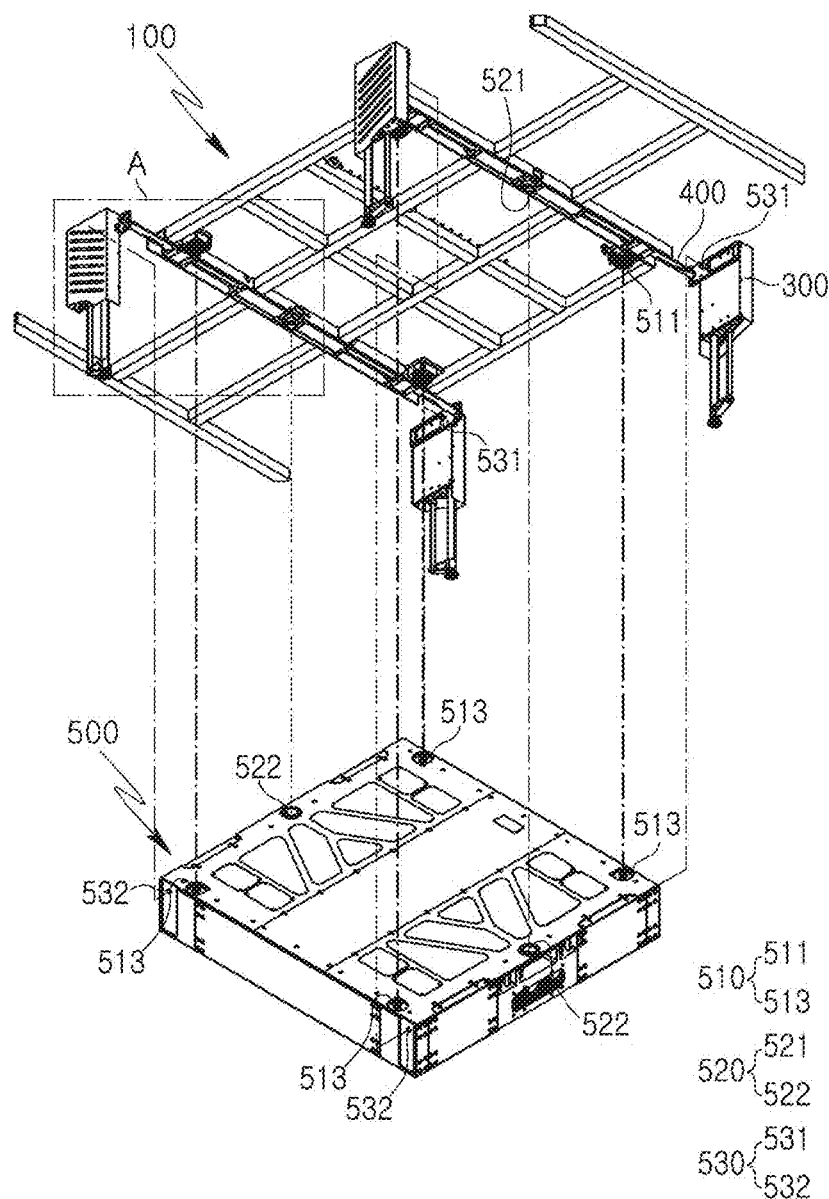
FIG. 4 is an exploded perspective view illustrating a cabin coupling portion and a board coupling portion of an elevating apparatus according to an exemplary embodiment of the present disclosure.

FIG. 1 is a perspective view of a vehicle including an elevating apparatus 10 according to an exemplary embodiment of the present disclosure, FIG. 2 is a conceptual diagram of a vehicle including the elevating apparatus 10 according to an exemplary embodiment of the present disclosure, FIG. 3 is a diagram illustrating a process of using the elevating apparatus 10 in a flood situation according to another exemplary embodiment of the present disclosure, and FIG. 4 is an exploded perspective view illustrating a cabin coupling portion 100 and a board coupling portion 500 of the elevating apparatus 10 according to an exemplary embodiment of the present disclosure.

Referring to FIGS. 1 to 4, a vehicle body of a vehicle may include a cabin 1 and a skateboard platform 2, and the elevating apparatus 10 according to an exemplary embodiment of the present disclosure is installed on both sides of the cabin 1.

The skateboard platform 2 may form a bottom surface of the vehicle body, and the skateboard platform 2 may include wheels, suspension, a battery, a drive motor, etc. Meanwhile, the skateboard platform 2 may include a connector (not shown) for a separate battery or the drive motor.

The skateboard platform 2 may be detachably coupled to the cabin 1, and may be coupled to the cabin 1 to move the cabin 1.

In addition, the cabin 1 may form a boarding space for a driver and an occupant and may be detachably coupled to the skateboard platform 2.

The elevating apparatus 10 may include a cabin coupling portion 100 provided in the cabin 1 and raising the cabin 1 and a board coupling portion 500 provided in the skateboard platform 2 and coupled to the cabin coupling portion 100.

The cabin coupling portion 100 may include a plurality of elevating modules 200.

The cabin coupling portion 100 may include at least four elevating modules 200, and the elevating modules 200 may be provided on both sides of the vehicle body in a front-rear direction.

The elevating module 200 provided in the cabin coupling portion 100 may include first to fourth elevating module 201, 202, 203, and 204. The first elevating module 201 may be provided on the right front wheel side, the second elevating module 202 may be provided on the left front wheel side, the third elevating module 203 may be provided on the right rear wheel side, and the fourth elevating module 204 may be provided on the left rear wheel side.

The first to fourth elevating modules 201, 202, 203, and 204 are arbitrarily classified according to positions thereof and are not limited thereto.

In addition, the first to fourth elevating modules 201, 202, 203, and 204 are arranged to be bilaterally symmetrical to stably elevate the cabin 1, but are not limited thereto and the first to fourth elevating modules 201, 202, 203, and 204 may be arranged in various forms as long as the arrangement ensures stable elevation of the cabin 1.

The elevating module 200 may include a main elevating unit 300 contacting the ground and extending in length to elevate the cabin 1 and an auxiliary elevating unit 400 adjusting a position of the main elevating unit 300.

Figure 8:
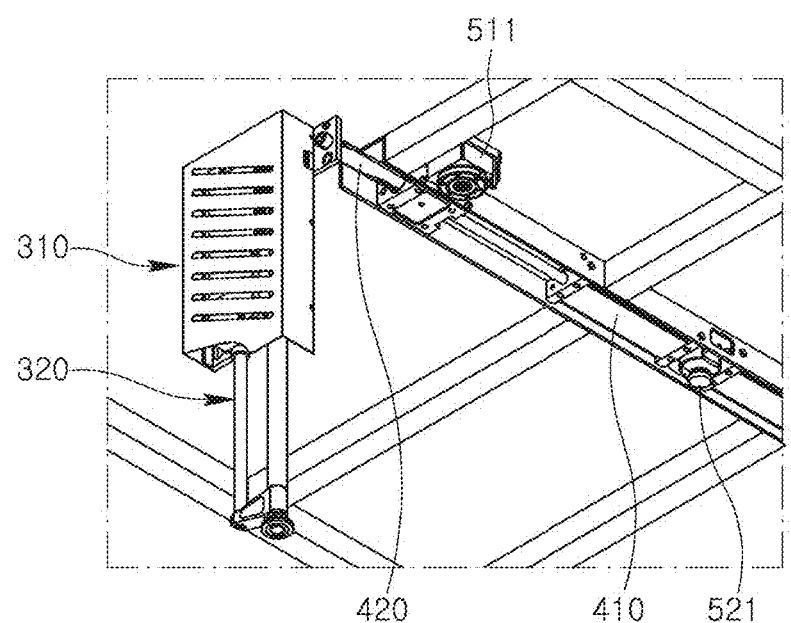
FIG. 8 is a perspective view of a main elevating unit and an auxiliary elevating unit according to an exemplary embodiment of the present disclosure.
Figure 9A:
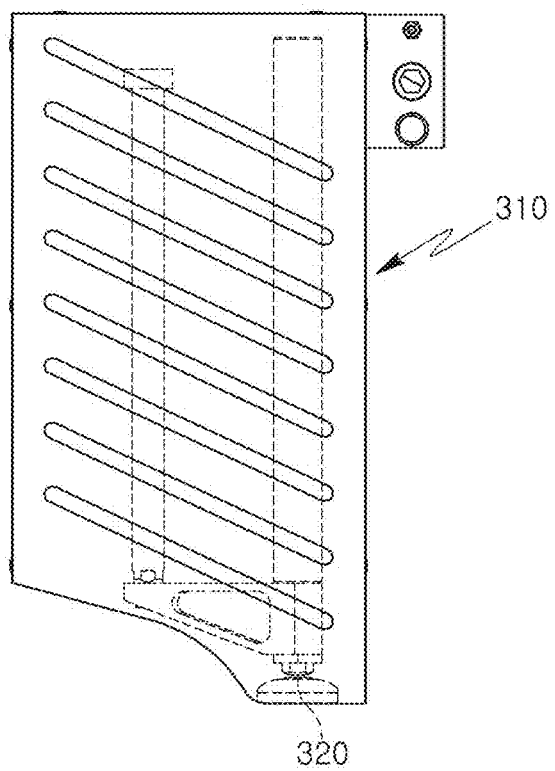
FIGS. 9A and 9B are plan views illustrating a state of use of the main elevating unit according to an exemplary embodiment of the present disclosure.
Figure 9B:
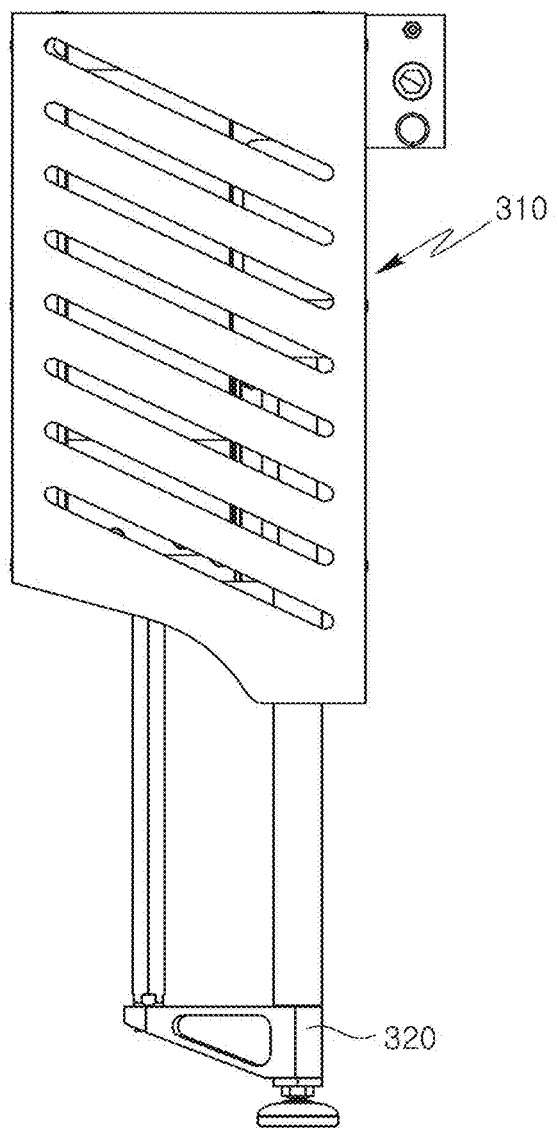
Figure 10A:
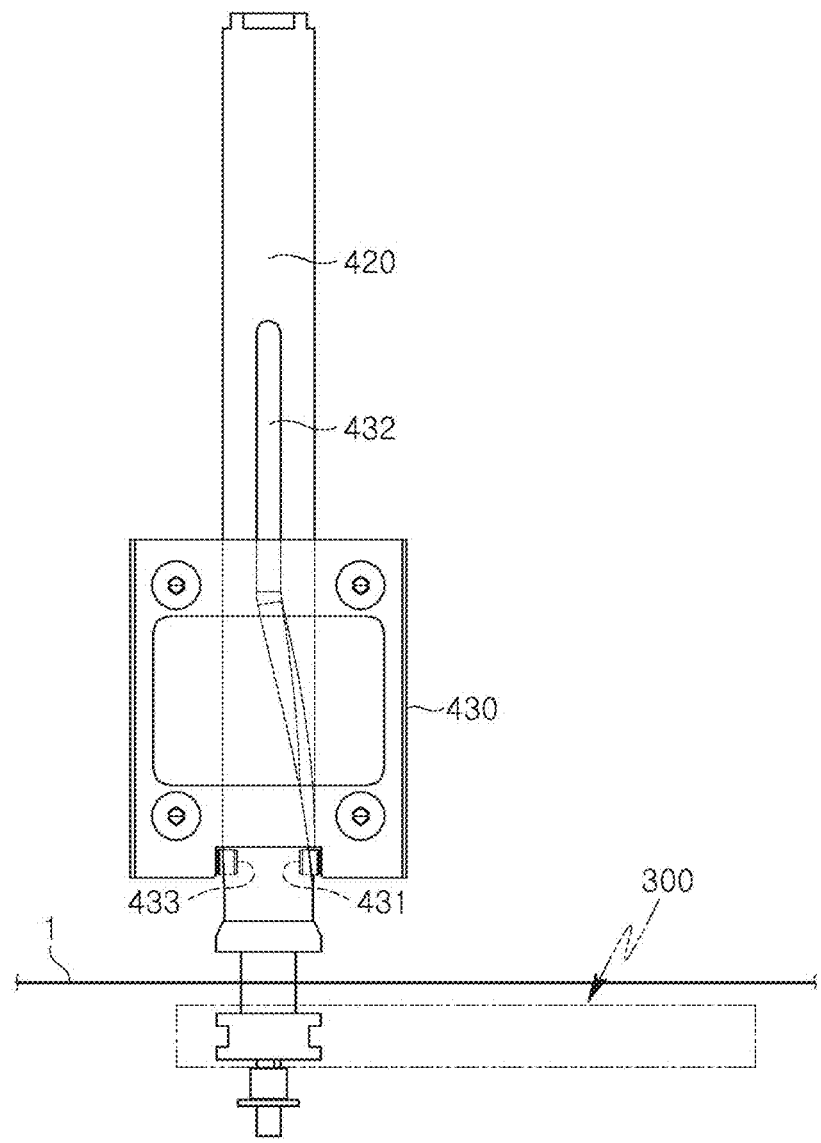
FIGS. 10A, 10B, and 10C are plan views illustrating a state of use of the auxiliary elevating unit according to an exemplary embodiment of the present disclosure.
Figure 10B:
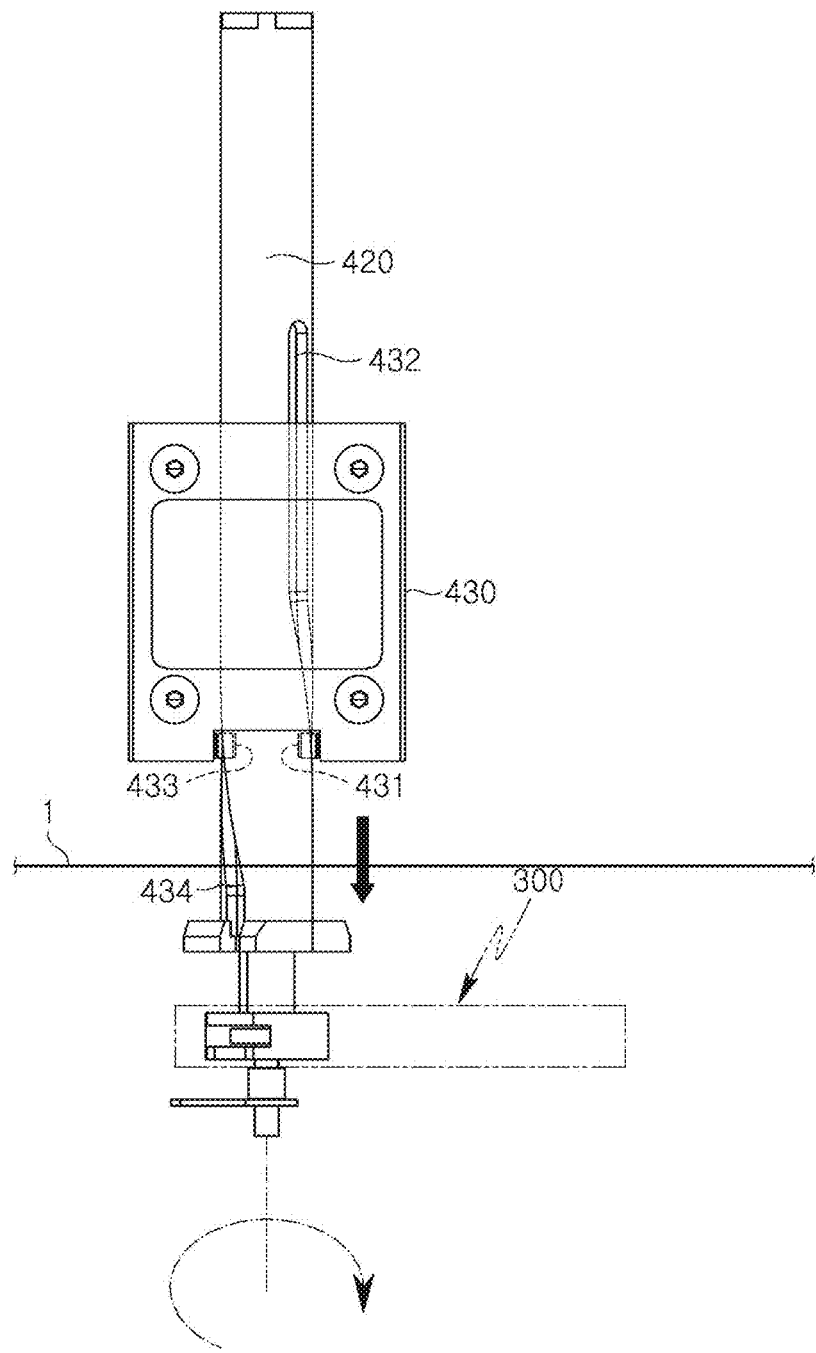
Figure 10C:
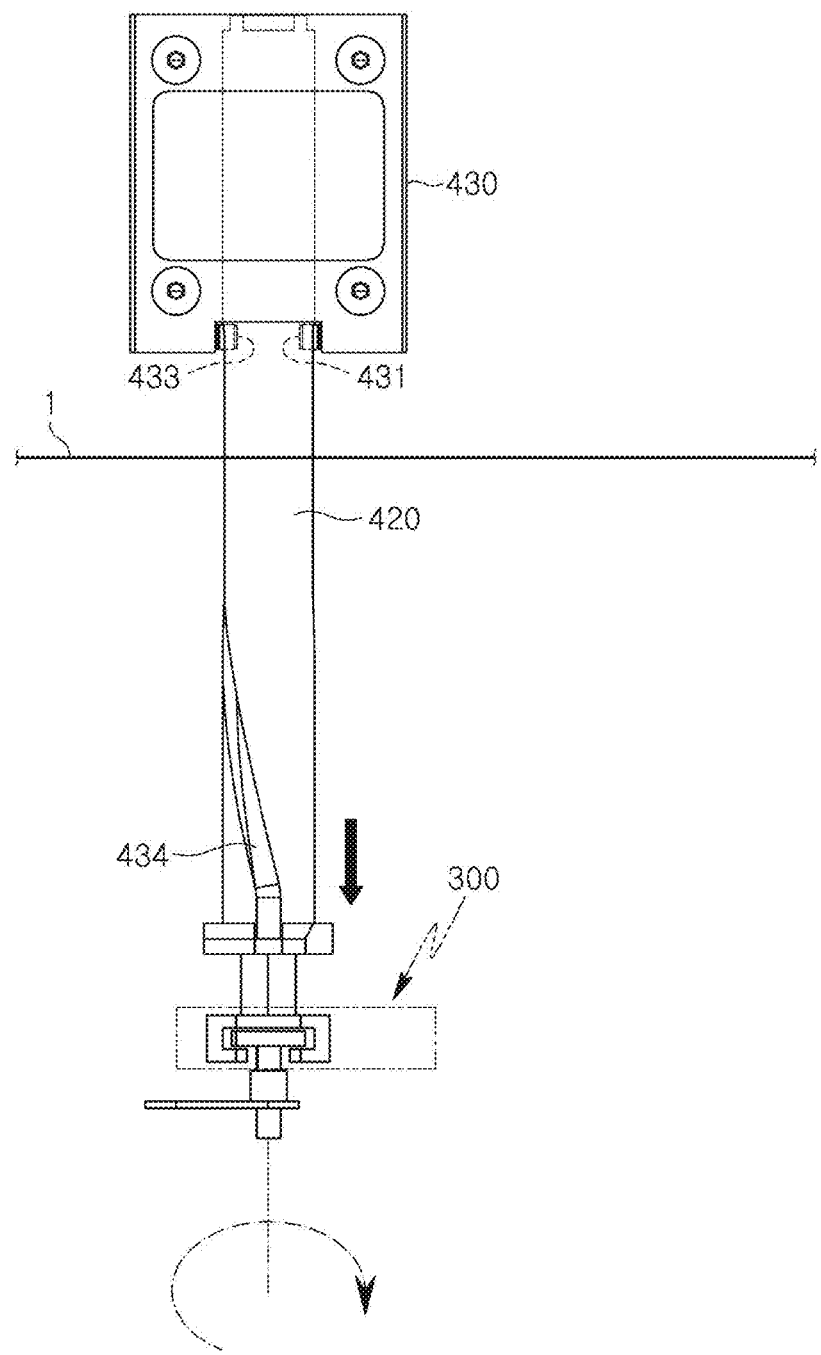

FIG. 8 is a perspective view of the main elevating unit 300 and the auxiliary elevating unit 400 according to an exemplary embodiment of the present disclosure, FIGS. 9A and 9B are plan views illustrating a state of use of the main elevating unit 300 according to an exemplary embodiment of the present disclosure, and FIGS. 10A to 10C are plan views illustrating a state of use of the auxiliary elevating unit 400 according to an exemplary embodiment of the present disclosure.

Referring to FIGS. 8, 9A and 9B, and 10A to 10C, along with FIGS. 1 to 4, the main elevating unit 300 may include a first cylinder 310 and a first piston 320 that makes a translational motion along the first cylinder 310.

One side of the main elevating unit 300 may be coupled to and supported by the auxiliary elevating unit 400.

The main elevating unit 300 may protrude to the outside of the vehicle body by the auxiliary elevating unit 400 to raise and lower the cabin 1 or may be stored in contact with the vehicle body.

The auxiliary elevating unit 400 may protrude the main elevating unit 300 to the outside of the vehicle body.

The auxiliary elevating unit 400 may include a second cylinder 410 and a second piston 420 that makes a translational motion along the second cylinder 410.

The second cylinder 410 may be supported at a lower portion of the cabin 1, and one end of the second piston 420 may be coupled to the main elevating unit 300.

The auxiliary elevating unit 400 may further include a guide portion 430 provided so that the second piston 420 penetrates between the main elevating unit 300 provided at one end of the second piston 420 and the second cylinder 410.

The second piston 420 may rotate while making a translational motion along the second cylinder 410 by the guide portion 430 and may rotate the main elevating unit 300 provided at one end.

The guide portion 430 may include a first slot 432, which is a groove extending to one end in an axial direction on a cylindrical outer peripheral surface, and a second slot 434 provided in a shape corresponding to the first slot 432 on a surface opposite to the first slot 432.

The first slot 432 and the second slot 434 may be formed such that a starting point of the slot and an ending point of one end of the slot are at 90 degrees based on a cross-section of the slot.

In addition, the guide portion 430 may further include a first protrusion 431 and a second protrusion 433 protruding to a height corresponding to the grooves of the first slot 432 and the second slot 434 and seated in the first slot 432 and the second slot 434.

Here, when making a translational motion along the second cylinder 410, the second piston 420 may make the translational motion as a shaft thereof rotates by the first slot 432 and the second slot 434 provided on the outer surface of the piston and the first protrusion 431 and the second protrusion 433 seated in the first slot 432 and the second slot 434.

Therefore, the main elevating unit 300 protrudes to the outside of the cabin 1 to elevate the cabin 1, and thus, the skateboard platform 2 may be easily replaced by avoiding interference with the wheel provided in the skateboard platform 2, regardless of the shape of the cabin 1.

In addition, the auxiliary elevating unit 400 rotates the main elevating unit 300 to protrude, so that the main elevating unit 300, which inevitably has a predetermined length depending on the cylinder and piston structure, may be stored in a longitudinal direction of the vehicle body, and when raising or lowering the cabin 1, the main elevating unit 300 may rotate and protrude outwardly, so that the cabin 1 may be raised and lowered without interfering with the skateboard platform 2.

The elevating apparatus 10 according to an exemplary embodiment of the present disclosure may include a first coupling portion 510, a second coupling portion 520, and a third coupling portion 530.

Figure 5A:
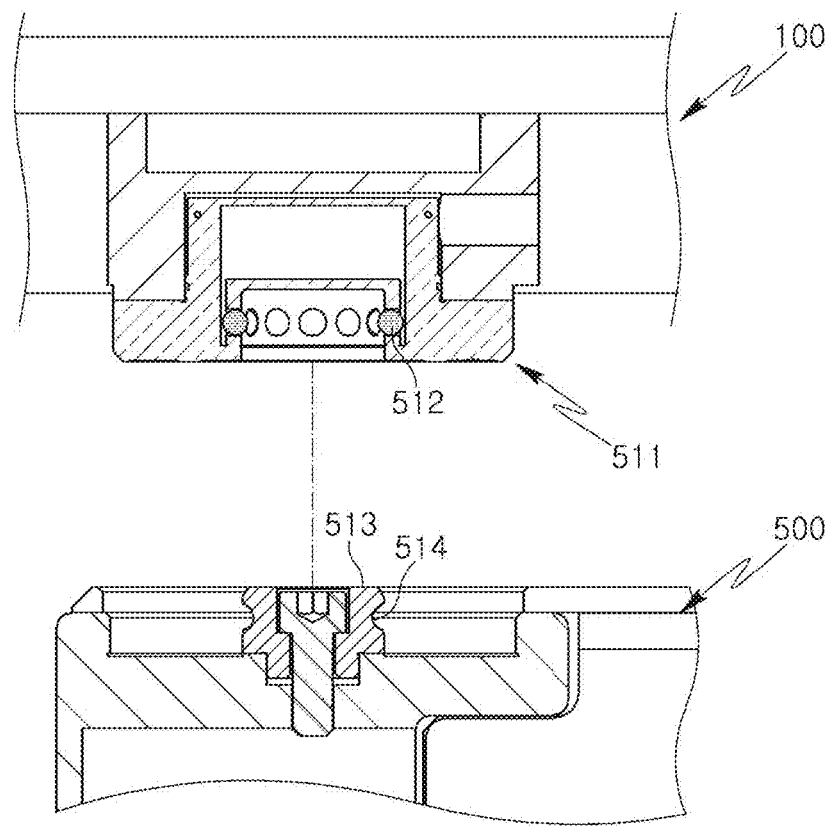
FIG. 5A is a side cross-sectional view of a first coupling portion before coupling a cabin coupling portion and a board coupling portion, according to an exemplary embodiment of the present disclosure.
Figure 5B:
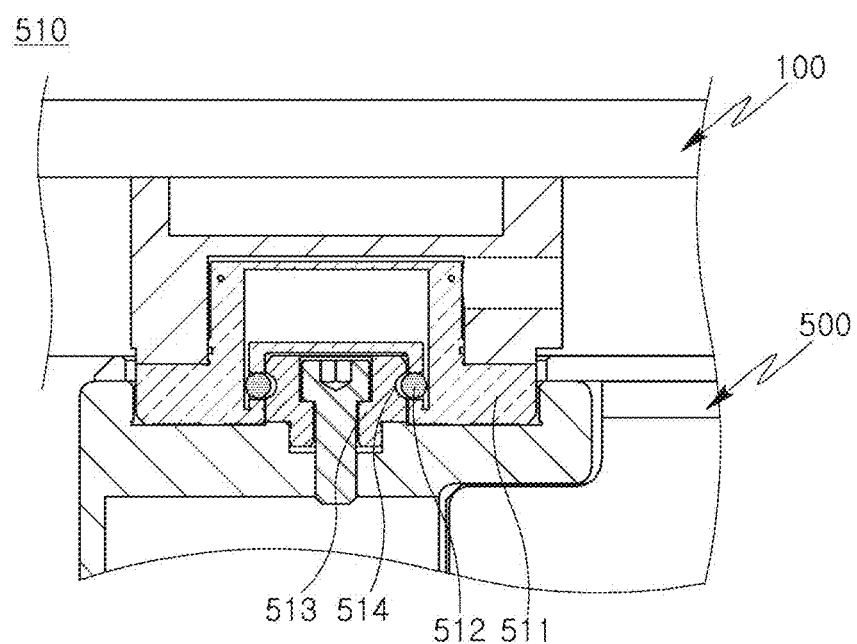
FIG. 5B is a side cross-sectional view of the first coupling portion in a state in which the cabin coupling portion and the board coupling portion are coupled, according to an exemplary embodiment of the present disclosure.

FIG. 5A is a side cross-sectional view of the first coupling portion 510 before the cabin coupling portion 100 and the board coupling portion 500 are coupled, according to an exemplary embodiment of the present disclosure, and FIG. 5B is a side cross-sectional view of the first coupling portion 510 in a state in which the cabin coupling portion 100 and the board coupling portion 500 are coupled.

Referring to FIGS. 5A and 5B, the first coupling portion 510 may include an upper support portion 511 provided in the cabin coupling portion 100 and a lower support portion 513 provided in the board coupling portion 500 and inserted into and coupled to the upper support portion 511.

The upper support portion 511 may further include a pressing portion 512 pressing and fixing the lower support portion 513.

The upper support portion 511 may have an opening opened on the lower support portion 513 side, and the pressing portion 512 may press the lower support portion 513 by adjusting the size of an inner surface of the opening using a plurality of balls arranged on an inner peripheral surface of the opening.

The lower support portion 513 may further include a pressing support portion 514 formed to be dent along an outer peripheral surface at a height corresponding to the position of the pressing portion 512 of the upper support portion 511.

The pressing support portion 514 may be formed to have a smaller outer diameter than the outer surface of the lower support portion 513, and the pressing portion 512 may press the pressing support portion 514 to couple the upper support portion 511 and the lower support portion 513.

Referring to FIG. 4, the first coupling portions 510 may be provided in a number corresponding to the elevating modules 200, but is not limited thereto, and the number and arrangement of the first coupling portions 510 may vary depending on the shape and weight of the cabin 1.

The elevating apparatus 10 according to an exemplary embodiment of the present disclosure may restrain the cabin coupling portion 100 and the board coupling portion 500 not only in front, rear, left, and right positions but also in up and down positions using the first coupling portion 510.

Figure 6A:
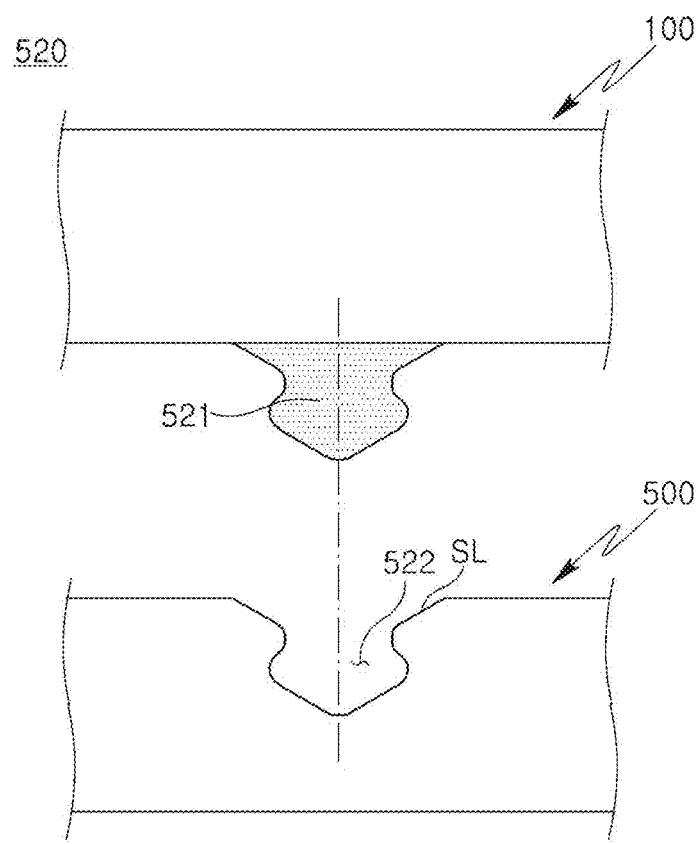
FIG. 6A is a side cross-sectional view of a second coupling portion according to an exemplary embodiment of the present disclosure.
Figure 6B:
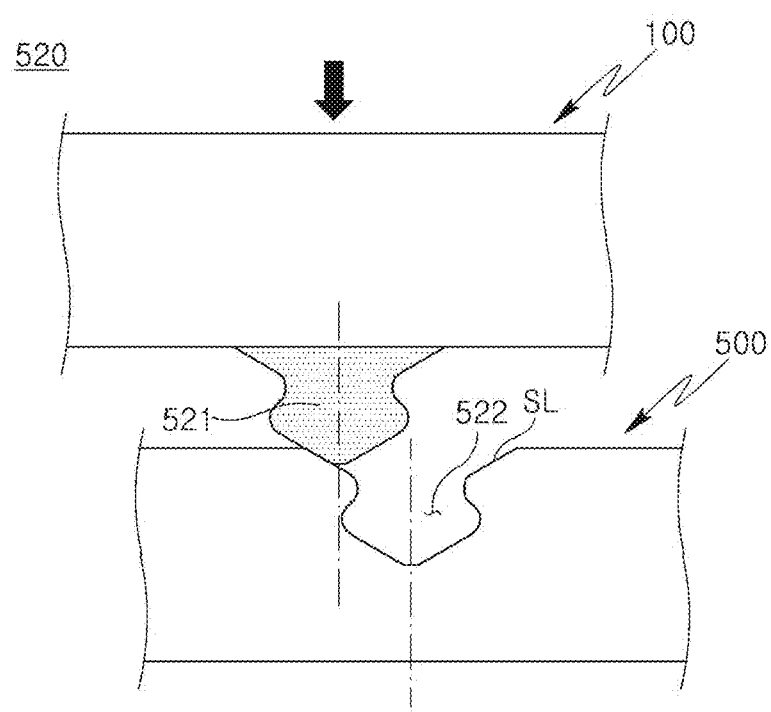
FIG. 6B is a side cross-sectional view of the second coupling portion illustrating a coupling process according to an exemplary embodiment of the present disclosure.
Figure 6C:
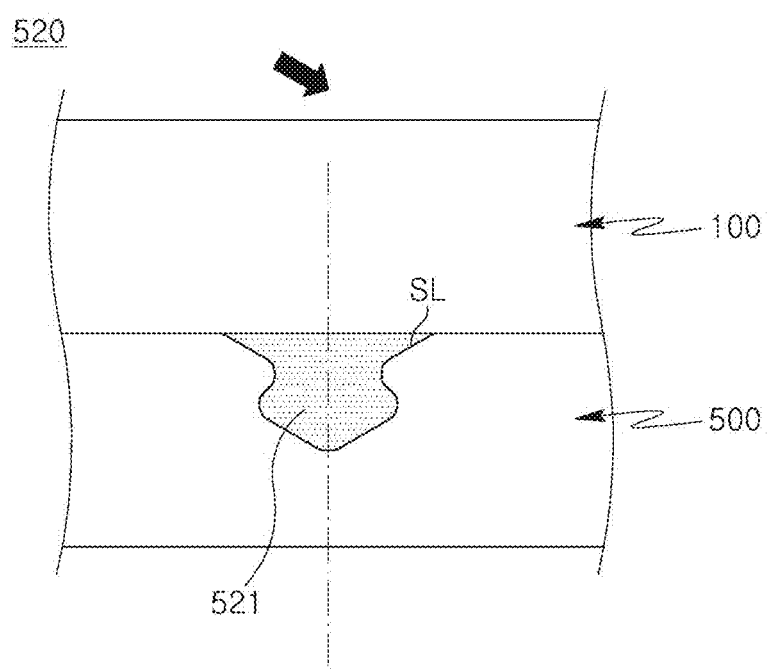
FIG. 6C is a side cross-sectional view of a second coupling portion illustrating a coupling process according to an exemplary embodiment of the present disclosure.

FIG. 6A is a side cross-sectional view of the second coupling portion 520 according to an exemplary embodiment of the present disclosure, FIG. 6B is a side cross-sectional view of the second coupling portion 520 illustrating a coupling process according to an exemplary embodiment of the present disclosure, and FIG. 6C is a side cross-sectional view of the second coupling portion 520 illustrating a coupling process according to an exemplary embodiment of the present disclosure.

Referring to FIG. 6A, the second coupling portion 520 may include a first insertion portion 521 provided in the cabin coupling portion 100 and a first recess portion 522 provided in the board coupling portion 500 and allowing the first insertion portion 521 to be inserted therein.

The first insertion portion 521 and the first recess portion 522 may have shapes corresponding to each other, and the first insertion portion 521 may be inserted into the first recess portion 522 to couple the cabin coupling portion 100 and the board coupling portion 500.

Here, the first insertion portion 521 and the first recess portion 522 may have a section in which the size of a cross-section changes in an insertion direction, and through this, they may be more tightly coupled.

In addition, at least one of the first insertion portion 521 and the first recess portion 522 may be provided as elastic members having a shape corresponding to each other and may be inserted into each other even when the cross-section changes.

The second coupling portion 520 may further include an inclined surface SL provided along an outer peripheral surface of the first recess portion 522.

Referring to FIGS. 6B and 6C, the cabin coupling portion 100 and the board coupling portion 500 may not be accurately aligned.

Here, since the second coupling portion 520 includes the inclined surface SL, the first insertion portion 521 may be guided to be inserted into the first recess portion 522 along the inclined surface SL.

Referring back to FIG. 4, two second coupling portions 520 may be arranged front and rear in the longitudinal direction of the vehicle body, but without being limited thereto, the number and arrangement of the second coupling portions 520 may vary depending on the shape and weight of the cabin 1.

In the elevating apparatus 10 according to an exemplary embodiment of the present disclosure, the cabin coupling portion 100 and the board coupling portion 500 may be restrained front, rear, left, and right using the second coupling portion 520, and the cabin coupling portion 100 and the board coupling portion 500 may be coupled using the first insertion portion 521 and the inclined surface SL even when there is a difference in a relative position or a relative inclination of the cabin coupling portion 100 and the board coupling portion 500.

Figure 7A:
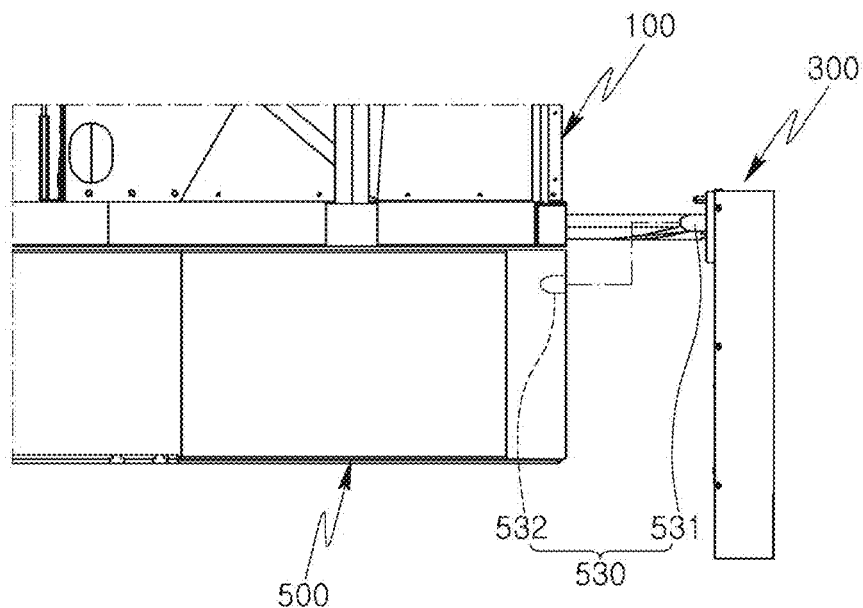
FIG. 7A is a side cross-sectional view of a third coupling portion before coupling the cabin coupling portion and the board coupling portion, according to an exemplary embodiment of the present disclosure.
Figure 7B:
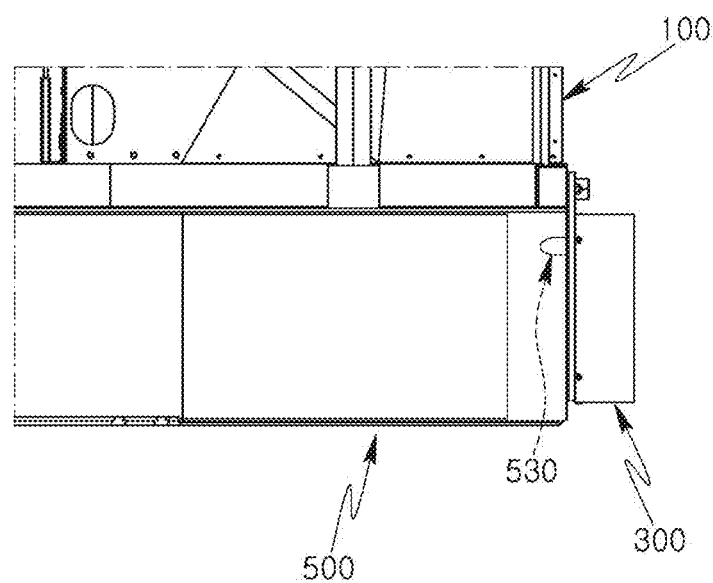
FIG. 7B is a side cross-sectional view of the third coupling portion in a state in which the cabin coupling portion and the board coupling portion are coupled, according to an exemplary embodiment of the present disclosure.

FIG. 7A is a side cross-sectional view of a third coupling portion 530 before the cabin coupling portion 100 and the board coupling portion 500 are coupled, according to an exemplary embodiment of the present disclosure, and FIG. 7B is a side cross-sectional view of the third coupling portion 530 in a state in which the cabin coupling portion 100 and the board coupling portion 500 are coupled, according to an exemplary embodiment of the present disclosure.

Referring to FIGS. 7A and 7B along with FIG. 4, the third coupling portion 530 according to an exemplary embodiment of the present disclosure may include a second insertion portion 531 provided on the main elevating unit 300 and protruding in the direction of the vehicle body and a second recess portion 532 provided in a position corresponding to the second insertion portion 531 in a position in which the main elevating unit 300 is stored.

Referring to FIG. 7A, the second insertion portion 531 may be provided in a portion of the same surface as that of the main elevating unit 300 to which the second piston 420 connecting the main elevating unit 300 to the auxiliary elevating unit 400 is coupled.

Referring to FIG. 7B, the main elevating unit 300 may be moved toward the board coupling portion 500 by the second piston 420, and the second insertion portion 531 of the main elevating unit 300 may be inserted into the second recess portion 532 provided on the board coupling portion 500 side.

As the second insertion portion 531 is inserted and coupled to the second recess portion 532, the board coupling portion 500 provided with the second recess portion 532 and the cabin coupling portion 100 to which the main elevating unit 300 provided with the second insertion portion 531 is connected may be coupled.

The third coupling portion 530 according to an exemplary embodiment of the present disclosure may constrain not only the front, rear, left, and right positions, but also up and down positions.

Figure 11:
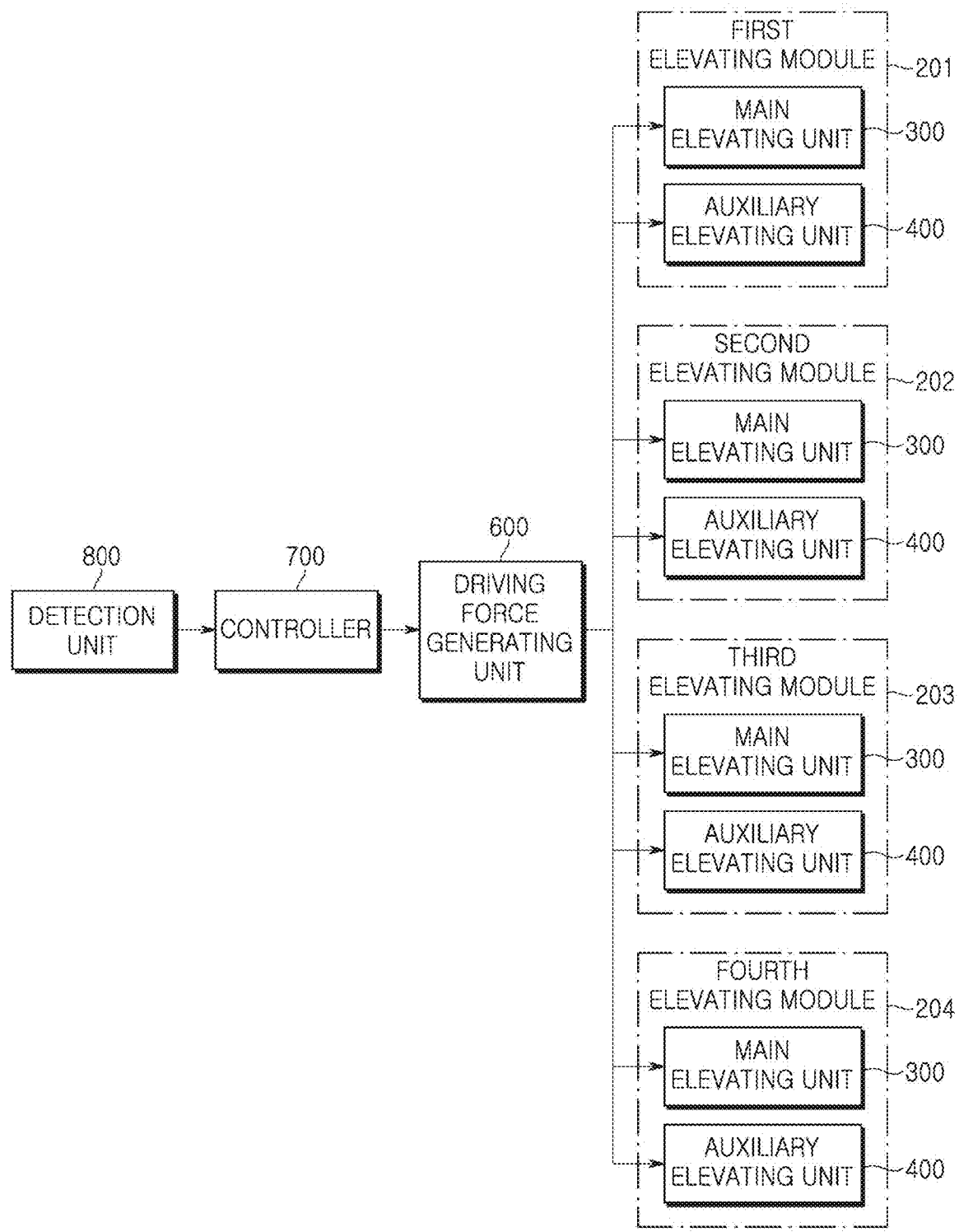
FIG. 11 is a block diagram of an elevating apparatus according to an exemplary embodiment of the present disclosure.

FIG. 11 is a block diagram of the elevating apparatus 10 according to an exemplary embodiment of the present disclosure.

Referring to FIG. 11 along with FIGS. 1 to 4, the elevating apparatus 10 according to an exemplary embodiment of the present disclosure may include a driving force generating unit 600 providing driving force to the main elevating unit 300 and the auxiliary elevating unit 400, a detection unit 800 identifying a state of the cabin 1, and a controller 700 controlling the driving force generating unit 600 based on the state of the cabin 1.

Here, the main elevating unit 300 and the auxiliary elevating unit 400 may be hydraulic or pneumatic cylinders, and the driving force generating unit may include a hydraulic or pneumatic pump and a hydraulic or pneumatic tank and adjust the magnitude of hydraulic or pneumatic pressure supplied to the main elevating unit 300 and the auxiliary elevating unit 400.

The detection unit 800 may identify the state of the cabin 1.

For example, the detection unit 800 may include a tilt sensor and may identify the tilt of the cabin 1 during an elevating and lowering process.

Alternatively, the sensing unit 800 may include at least two distance sensors and determine a distance between the cabin 1 and the ground or a distance between the cabin 1 and the skateboard platform 2. The detection unit 800 may identify a current state of the cabin 1 based on the distance value determined by each distance sensor.

For example, as the difference between the distance values determined by the distance sensor increases, the cabin 1 may be more unstable.

The controller 700 may control the driving force generating unit 600 by identifying the state of the cabin 1 determined by the detection unit 800 and may control the first to fourth elevating modules 201, 202, 203, and 204 individually.

For example, when the cabin 1 appears to be tilted toward the right rear wheel side, the controller 700 may control the driving force generating unit 600 to apply greater pressure to the main elevating unit 300 of the third elevating module 203 provided on the right rear wheel side of the cabin 1, to thereby increase the magnitude of driving of the main elevating unit 300 of the right rear wheel to balance the cabin 1.

The controller 700 may be implemented through a non-volatile memory (not shown) configured to store data regarding an algorithm configured to control operations of various components of the vehicle or software instructions for reproducing the algorithm and a processor (not shown) configured to perform an operation described below using the data stored in the corresponding memory.

Here, the memory and the processor may be implemented as individual chips. Alternatively, the memory and the processor may be integrated to be implemented as a single chip. The processor may take the form of one or more processors.

Figure 12:
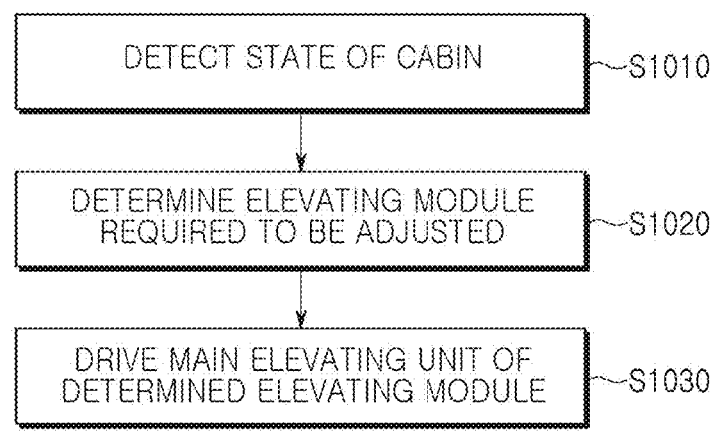
FIG. 12 is a flowchart of a control method of an elevating apparatus according to an exemplary embodiment of the present disclosure.

FIG. 12 is a flowchart of a control method of the elevating apparatus 10 according to an exemplary embodiment of the present disclosure.

Referring to FIG. 12, the control method of the elevating module 200 according to an exemplary embodiment of the present disclosure may include detecting a state of the cabin 1, determining the elevating module 200 required to be adjusted based on the state of the cabin 1, and driving the main elevating unit 300 of the elevating module 200.

In the operation of detecting a state of the cabin 1, the inclination of the cabin 1 may be determined using the sensing unit 800. When the cabin 1 needs to be replaced in a place other than a flat land, such as a repair shop, even if the elevating module 200 is operated in the same manner, if the cabin 1 is placed on a slope or a place with an uneven surface, the balance may be lost.

In the operation of determining the elevating module 200 that needs to be adjusted based on the state of the cabin 1 and the operation of driving the main elevating unit 300 of the elevating module 200, in the operation of detecting the state of the cabin 1, the elevating module 200 that needs to be adjusted may be determined based on the determined inclination of the cabin, and the main elevating unit 300 of the determined elevating module 200 may be adjusted.

For example, when it is determined that the cabin 1 is inclined from the right front wheel side to the left rear wheel side, the controller 700 may determine to control the fourth elevating module 204 located on the left rear wheel using the driving force generating unit 600 and may control the main elevating unit 300 of the fourth elevating module 204 to elevate the cabin 1 higher to balance the cabin 1.

In addition, the controller 700 may determine to control the first elevating module 201 located on the right front wheel and may control to lower the height of the main elevating unit 300 of the first elevating module 201 to balance the cabin 1.

In the elevating apparatus and the vehicle including the same according to an exemplary embodiment of the present disclosure, a plurality of cabins may be coupled with a single skateboard platform to be variously utilized, so that the skateboard platform and the cabin may be easily replaced, thereby significantly increasing utilization of the vehicle.

The elevating apparatus and the vehicle including the same according to an exemplary embodiment of the present disclosure may couple the skateboard platform and the cabin even on slopes or where the road surface is uneven.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or may be publicly known and available to those who are skilled in the field of computer software.

Examples of the computer readable medium may include a hardware device, such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module in order to perform the exemplary embodiments of the present disclosure, and vice versa.

While exemplary embodiments have been shown and described above, it will be apparent to those skilled in the art that modifications and variations could be made without departing from the scope of the present disclosure as defined by the appended claims.

The invention claimed is:

1. An elevating apparatus comprising:
   a cabin comprising an internal space of a vehicle body; and
   a cabin coupling portion including an elevating module coupled to the cabin and configured to raise the cabin from a ground,
   wherein the elevating module protrudes to an outside of the vehicle body to raise the cabin;
   wherein the elevating module includes:
   a main elevating unit configured to raise the vehicle body; and
   an auxiliary elevating unit configured to cause the main elevating unit to protrude to the outside of the vehicle body; and
   wherein the auxiliary elevating unit includes:
   a second cylinder coupled to a lower portion of the cabin; and
   a second piston having one side coupled to the main elevating unit and the other side making a translational motion along the second cylinder.

2. The elevating apparatus of claim 1, wherein, when the cabin is not raised or lowered, the main elevating unit is coupled to the vehicle body in a state in which a direction in which a length of the main elevating unit extends is a longitudinal direction of the vehicle body.

3. The elevating apparatus of claim 1, wherein the main elevating unit includes:
   a first cylinder; and
   a first piston configured to make a translational motion along the first cylinder.

4. The elevating apparatus of claim 3, wherein the auxiliary elevating unit rotates the main elevating unit to protrude outside the vehicle body.

5. The elevating apparatus of claim 1, further comprising:
   a slot formed with a thread along an outer peripheral surface of the second piston; and
   a protrusion surrounding the second piston and partially protruding and configured to be inserted into the slot.

6. An elevating apparatus comprising:
a cabin forming an internal space of a vehicle body;
a skateboard platform forming a lower portion of the vehicle body and detachably coupled to the cabin;
a cabin coupling portion provided in the cabin and including an elevating module configured to raise the cabin from a ground; and
a board coupling portion provided on the skateboard platform and coupled to the cabin coupling portion;
wherein the elevating module includes:
a main elevating unit configured to raise the vehicle body; and
an auxiliary elevating unit configured to cause the main elevating unit to protrude to the outside of the vehicle body; and
wherein the auxiliary elevating unit includes:
a second cylinder coupled to a lower portion of the cabin; and
a second piston having one side coupled to the main elevating unit and the other side making a translational motion along the second cylinder.

7. The elevating apparatus of claim 6, further comprising a first coupling portion coupling the cabin coupling portion to the board coupling portion.

8. The elevating apparatus of claim 7, wherein the first coupling portion includes:
a lower support portion provided at the board coupling portion protruding toward the cabin coupling portion; and
an upper support portion provided at the cabin coupling portion and coupled to the lower support portion.

9. The elevating apparatus of claim 8, wherein the lower support portion includes a pressing support portion depressed toward a center along an outer surface, and
the upper support portion further includes a pressing portion configured to press the pressing support portion.

10. The elevating apparatus of claim 7, further comprising a second coupling portion configured to align the cabin coupling portion and the board coupling portion.

11. The elevating apparatus of claim 10, wherein the second coupling portion is depressed with a predetermined slope.

12. An elevating apparatus comprising:
a cabin forming an internal space of a vehicle body;
a skateboard platform forming a lower portion of the vehicle body and detachably coupled to the cabin;
a cabin coupling portion provided in the cabin and including an elevating module configured to raise the cabin from a ground;
a board coupling portion provided on the skateboard platform and coupled to the cabin coupling portion;
a first coupling portion coupling the cabin coupling portion to the board coupling portion; and
a second coupling portion configured to align the cabin coupling portion and the board coupling portion;
wherein the second coupling portion further includes:
a first insertion portion protruding from the cabin coupling portion toward the board coupling portion; and
a first recess portion formed at a lower portion of the board coupling portion at a height corresponding to the first insertion portion.

13. An elevating apparatus comprising:
a cabin forming an internal space of a vehicle body;
a cabin coupling portion coupled to the cabin and including an elevating module configured to raise the cabin from a ground;
a driving force generating unit configured to generate driving force capable of driving the elevating module; and
a controller configured to control the driving force generating unit;
wherein the elevating module includes:
a main elevating unit configured to raise the vehicle body; and
an auxiliary elevating unit configured to cause the main elevating unit to protrude to the outside of the vehicle body; and
wherein the auxiliary elevating unit includes:
a second cylinder coupled to a lower portion of the cabin; and
a second piston having one side coupled to the main elevating unit and the other side making a translational motion along the second cylinder.

14. The elevating apparatus of claim 13, wherein the cabin coupling portion includes first, second, third, and fourth elevating modules, and the controller individually controls driving force of the first, second, third, and fourth elevating modules.

15. The elevating apparatus of claim 14, further comprising a detection unit configured to detect an inclination of the cabin, wherein the controller is configured to control at least one of the first, second, third, or fourth elevating modules based on the inclination of the cabin.

16. The elevating apparatus of claim 13,
wherein the auxiliary elevating unit rotates the main elevating unit to protrude outside the vehicle body.

* * * * *